United States Patent

[11] 3,589,171

| [72] | Inventor | Floyd C. Haley<br>La Canada, Calif. |
|---|---|---|
| [21] | Appl. No. | 852,825 |
| [22] | Filed | Aug. 25, 1969 |
| [45] | Patented | June 29, 1971 |
| [73] | Assignee | California Institute of Technology<br>Pasadena, Calif. |

[54] GAS ANALYSIS SYSTEM AND PALLADIUM TUBE SEPARATOR THEREFOR
19 Claims, 4 Drawing Figs.

[52] U.S. Cl. ................................................ 73/23.1,
23/232, 55/16, 250/41.9
[51] Int. Cl. .................................................... G01n 31/08,
B01d 53/22, H01j 39/34
[50] Field of Search.......................................... 73/19, 23,
23.1; 55/16, 158, 197; 23/232; 250/41.9 G, 41.9 S

[56] References Cited
UNITED STATES PATENTS

| 3,174,326 | 3/1965 | Carle | 73/23.1 |
|---|---|---|---|
| 3,291,980 | 12/1966 | Coates | 73/23.1 X |
| 3,400,514 | 9/1968 | Noda | 55/158 |
| 3,430,417 | 3/1969 | Cree | 55/16 |
| 3,439,474 | 4/1969 | McKinley | 55/16 |
| 3,479,798 | 11/1969 | Ryhage | 73/23.1 X |

Primary Examiner—Richard C. Queisser
Assistant Examiner—C. E. Snee, III
Attorneys—Arthur Freilich and Samuel Lindenberg ABSTRACT: Sequential analytical determination of a vapor sample is performed by suspending the sample in a major amount of hydrogen carrier gas or a mixed carrier gas consisting of hydrogen and helium and passing the suspension through a gas chromatograph. More than 90 percent of the hydrogen carrier gas is removed from the effluent of the chromatograph by passing the effluent through a heated palladium tube before delivering to a detector such as a mass spectrometer. Removal of the hydrogen portion of the carrier gas through the wall of the tube may be enhanced by providing an oxygen containing atmosphere at the outside surface of the tube.

*INVENTOR.*
FLOYD C. HALEY 3,589,171

GAS ANALYSIS SYSTEM AND PALLADIUM TUBE SEPARATOR THEREFOR

ORIGIN OF THE INVENTION

The invention described herein was made in the performance of work under a NASA contract and is subject to the provisions of Section 305 of the National Aeronautics and Space Act of 1958, Public Law 85-568 (72 stat. 435; 42 U. S. C. 2457).

BACKGROUND OF THE INVENTION

1. Field of the Invention

The present invention relates to a gas transfer device and to analysis systems incorporating such a device. More particularly, the present invention relates to interfacing a gas chromatograph and detector with an improved transfer device for removing carrier gas.

2. Description of the Prior Art

Analysis of complex samples of matter is greatly facilitated by gasifying the sample and then passing it in gasified form through a separation device such as a gas chromatograph which separates the components of the sample into sequential analytical component segments. In a gas chromatograph or other separation apparatus, gas or vapor sample to be analyzed is transported through the various functional parts of the apparatus by a stream of carrier gas. While this procedure provides a highly sensitive method of analysis, it does however, introduce other problems. Thus, sample constituents present in minute quantities are so greatly diluted by the much larger quantity of carrier gas necessary for operation of the chromatograph column that they may be difficult or impossible to detect. Furthermore, the pressure and flow rate of the effluent emerging from the chromatograph may exceed the capability of a detector such as a mass spectrometer.

The problem of interfacing a gas chromatograph to a mass spectrometer has been approached from several directions. One approach has been to match the flow impedance of the system by scaling down dimensions of the chromatograph to suit the needs of the mass spectrometer. This, of course, is attended by a loss of speed and resolution, and the low volume of carrier gas may then render components present in small or trace amounts undetectable by the mass spectrometer or other detector. In another approach, the gas chromatograph is interfaced with a capillary column before passing the effluent into the mass spectrometer in order to collect and concentrate small amounts of samples before transfer to the high vacuum system of a mass spectrometer. This procedure is quite tedious and increases the complexity of the apparatus and of the analysis.

Some improvement has been achieved by the use of plastic membranes or a fritted glass surface to separate carrier gas before introduction of the effluent into a mass spectrometer. These separators are unsatisfactory because they remove only a small portion of the carrier gas and thus provide a limited sample enrichment. Since the entire effluent cannot be introduced into the mass spectrometer, considerable sample loss occurs. This renders the entire interfacing operation quite unreliable.

OBJECTS AND SUMMARY OF THE INVENTION

It is therefore an object of the invention to interface a gas sample constituent separator such as a gas chromatograph with a carrier gas separator device attendant with absolutely no loss of sample being analyzed.

Another object of the present invention is to increase the sensitivity and reliability of gas analysis systems.

A further object of the invention is the provision of a gas analysis system capable of accurately analyzing very small quantities of sample.

Yet another object of the present invention is the provision of an improved hydrogen gas separation device.

A still further object of the invention is to improve sensitivity of analysis by enriching the effluent stream from a gas chromatograph.

A further object of the invention is to provide a flow impedance matched gas chromatograph-mass spectrometer gas analysis system.

These and other objects and many attendant advantages of the invention will become apparent as the description proceeds.

A sample of vaporous material is enriched according to the invention by dispersing the material in vaporous form in a first carrier gas and passing the dispersion through a transfer device which is selectively and totally permeable to the first carrier gas to produce a dispersion enriched in said material. In the case of a hydrogen carrier gas dispersion, the transfer device comprises a tube of palladium heated to a temperature at which the walls of the tube become permeable to hydrogen. Hydrogen flow through the walls of the tube is enhanced by providing an oxygen containing atmosphere on the outside surface of the tube.

The tube may be operated under conditions in which the hydrogen carrier gas is totally removed and in this case the sample of material may be transferred to a second carrier gas impermeable to the walls of the tube. In the case of an effluent containing sequential segregated constituents of the sample, the tube may be provided in a configuration tapering toward the outlet of the transfer device so as to provide increased resolution of each constituent. A gas analysis system according to the invention comprises means for segregating a vaporous sample of matter into sequential segregated constituents dispersed in a major amount of a first carrier gas, detector means for sensing each constituent and carrier gas transfer means disposed between the separating means and detector means selectively and totally permeable to the first carrier gas.

The invention will now become better understood by reference to the following detailed description when considered in conjunction with the accompanying drawings.

DESCRIPTION OF THE PREFERRED EMBODIMENTS

Figure 1:
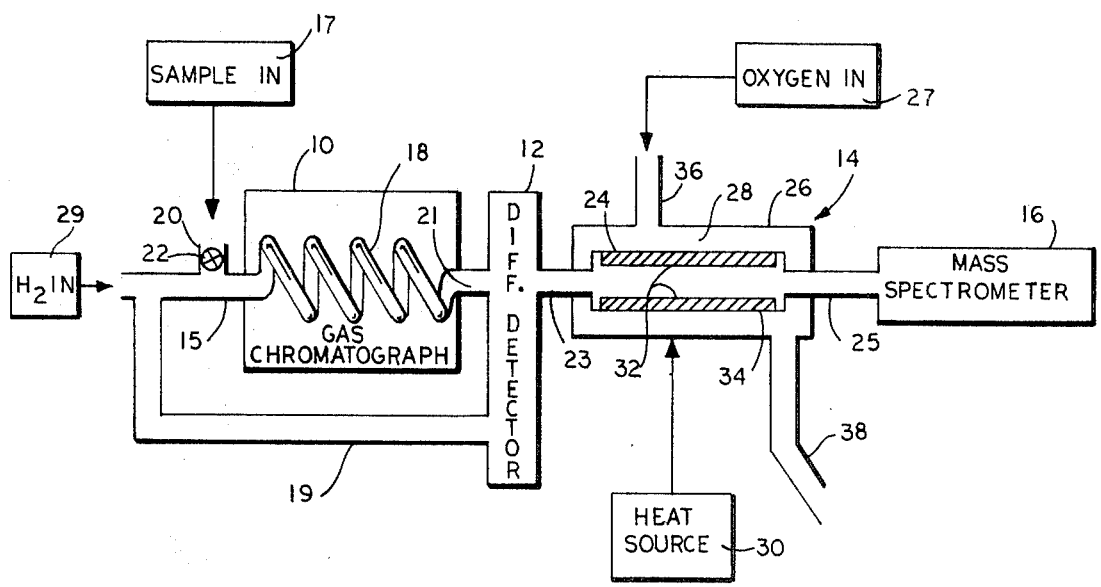
FIG. 1 is a schematic view of a first gas analysis system to the invention.

Referring now to FIG. 1 the gas analysis system according to the invention includes generally a gas chromatograph 10, a detector 12, a carrier gas transfer device 14 and a mass spectrometer 16. The gas chromatograph 10 includes a column 18 in the form of a spiral containing a series of adsorbents which segregate a gas sample by affecting the rate at which the components or constituents of the sample flow through the column 18 to provide an effluent containing a sequential passage of the components. The sample in vaporous form from sample source 17 is introduced into the column 18 through sample inlet 20 containing a metering valve 22. The sample is conveyed through the column by dispersing it within a first carrier gas such as hydrogen which is introduced into the column inlet 15 at a constant pressure and flow rate from a regulated flow control source 29. A portion of the first carrier gas is diverted through branch conduit 19 to the differential detector 12.

The effluent leaves the column 18 through outlet 21 passes through the detector 12 which is sensitive to the components of the effluent and through the carrier gas transfer device 14 before entering the mass spectrometer 16. The transfer device 14 is selected to be totally permeable to the first carrier gas but not to any other gas so that the first carrier gas is eliminated through the walls of the device 14. Thus, the components of the effluent are enriched in the first carrier gas. The enriched stream of sample passes into the mass spectrometer 16.

The first carrier gas may be hydrogen of high purity and the transfer device may then comprise a thin film of heated palladium. Palladium and its alloys are remarkably permeable to hydrogen as long as the film is maintained at a temperature of 100—150° C. The film is suitably maintained at temperatures below 600° C. to avoid unnecessary rearrangement of components subject to catalytic hydrogenation or rearrangement in the presence of heated palladium.

To prevent reaction with the sample components, the inner surface of the tube may be lined with a material such as flourocarbon resin, suitably Teflon, or Alundum or suitable equivalent to reduce the tendency of the reactive materials to catalyze. The lining must be thin enough to permit ready passage of hydrogen therethrough.

Referring again to FIG. 1, the transfer device 14 may be in the form of a thin walled tube 24 of palladium surrounded by an outer container 26 forming an annular first carrier gas exhaustion space 28. The inlet end of the tube is connected to the outlet 23 from the detector 12 and the outlet end 25 of the tube 24 is connected to the inlet end of the mass spectrometer 16.

The wall of the tube is heated by means of the heat source 30 to a temperature at which the tube becomes permeable to hydrogen, suitably from 200° C. to 500° C. Pure palladium when subject to temperature cycling in the presence of hydrogen suffers mechanical distortions. However, an alloy of palladium containing 25 percent silver is as permeable to hydrogen as pure palladium, but is mechanically stable. The palladium tube may be provided in various configurations and lengths of tubing may be wound in spirals or other shapes to compress and conserve space. Plural lengths may be connected in parallel to provide increased surface area with less flow resistance.

During hydrogen removals from the effluent a reaction is placed to occur involving the formation of palladium hydride on the inner surface 32 of the tube 24. The elevated temperature causes decomposition of the hydride to reform hydrogen on the outer surface 34.

The transfer rate of hydrogen through the tube wall may be enhanced by providing a pressure differential across the tube wall such as by increasing the internal pressure within the tube 24 or by applying vacuum to the annular space 28. However, since the hydride forming reaction is reversible through the wall of the tube 24, it is preferable to feed a hydrogen reactive gas from a source 27 into the space 28 through an inlet 36. For example, oxygen in the presence of palladium reacts with the hydrogen emerging from the outside surface 34 of the tube 24 to form water. The water can exit through the outlet drain 38. However, the gasified constituents of the sample are confined by the walls of the tube 24 and exit through the outlet end 25 of the tube to the mass spectrometer 16.

The chromatographic detector 12 may be a conventional colligative property sensor such as a thermal conductivity, ionization cross section or gas-density balance detector so as to determine the identity and amount of each segregated constituent flowing from the column. A signal from the detector may be amplified before being applied to a data storage read out device, not shown.

The improved enrichment technique according to the invention serves to eliminate the large volume of carrier gas required for operation of a gas chromatograph. The reduced volume becomes manageable and does not overload the vacuum system of the mass-spectrometer. The volume is reduced to a range to match the flow impedance of the mass spectrometer and thus, according to the invention, larger columns may be utilized and the flow impedance of any detector or mass-spectrometer ion source may be matched exactly.

The absolute hydrogen flux through the wall of the palladium tube is dependent on tube geometry, wall thickness, wall temperature and amount of oxygen in contact with the outer surface of the tube. The amount of oxygen can also be used to control the wall temperature since higher rates of oxygen flow produce higher tube temperatures. A palladium-25 silver alloy tube 0.05 inch in diameter, 12 inches long having a wall thickness of 0.005 inch is permeable to hydrogen when heated to 200° C. The flux of hydrogen through the wall of a palladium-25 silver alloy tube 0.025 centimeter and internal diameter having a 0.125 cm. wall thickness and a 25 cm. length varies with temperature as the tube is heated in air as shown in the following table:

| Temperature, ° C. | 200 | 250 | 300 | 350 | 400 | 450 |
|---|---|---|---|---|---|---|
| Flux, ml. sec.[11] | 0.2 | 0.22 | 0.25 | 0.30 | 0.38 | 0.45 |

Gas chromatograph column flow rates are typically in the range of of 0.01 to 1.0 ml. per second. Therefore, there is no great problem in choosing a length of palladium tubing long enough to efficiently remove the hydrogen from the chromatograph effluent. The sample typically comprises 1 percent of the volume of the first carrier gas. Removal of 90 percent of the hydrogen carrier gas in the transfer device increases the ratio of the carrier gas to the sample from 100 to 1 to 10 to 1 with a corresponding increase in sensitivity and detectivity. However, the gasified constituents of the sample are confined by the walls of the tube and exit through the outlet to the mass spectrometer with absolutely no loss of sample.

As discussed, the carrier gas transfer device can be operated at a level affecting complete removal of the hydrogen carrier gas from the column effluent. However, complete removal of the carrier gas may result in eliminating the propulsive means needed to convey the enriched, segregated sample constituent to the detector except for some slow drift. This could result in recombination of the segregated sample constituents. In passing through the transfer device tube, each constituent portion follows a preceding constituent portion in the form of a narrow band of gas having a cross section equal to that of the tube. Normally, a separator zone of pure hydrogen gas is interposed between each of the constituent bands. As the gas column of alternating hydrogen separator zones and constituent bands passes down the tube the hydrogen carrying the constituent bands and in the separator zones gradually evolves through the wall of the tube and this allows the constituent bands to move closer together. This effect increases the possibility of diffusion between adjacent constituent bands as the concentration of hydrogen in the separator zone lessens.

Figure 2:
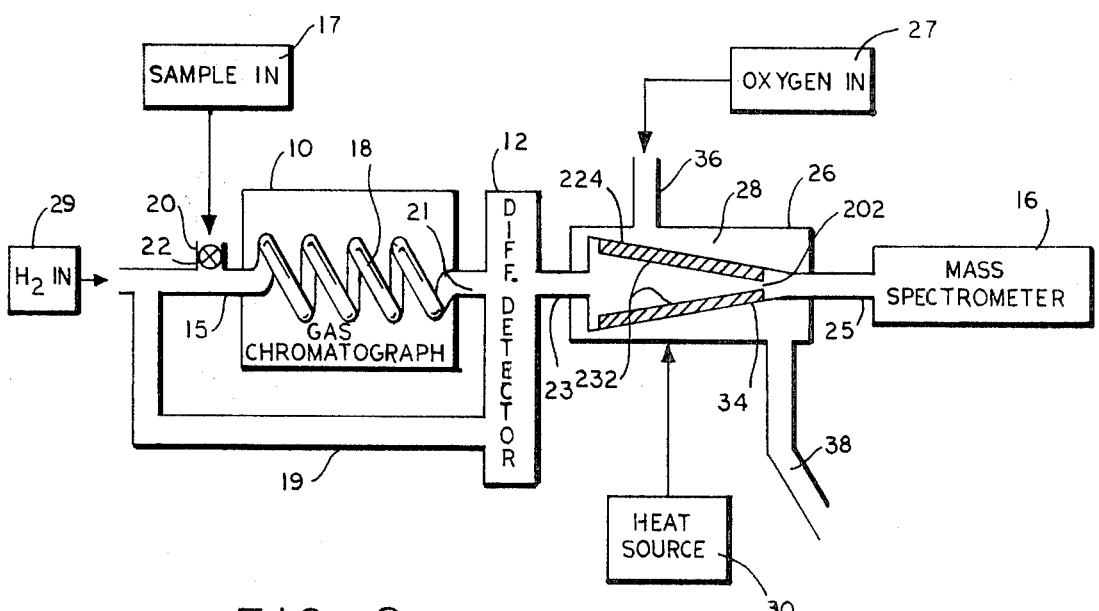
FIG. 2 is a schematic view of a second embodiment of the gas analysis system according to the invention.

Referring now to FIG. 2, a variation of the configuration of the palladium tube is illustrated which substantially alleviates this problem. The tube 224 is tapered to an extremely small outlet opening 202 or is connected to a suitable microfine valve so that it may serve as a molecular leak for introducing the sample into the mass spectrometer 16. When the separated alternating bands of constituents are introduced into the tapered tube 224 the zones will be compressed by the convergence of the tube interior 232. The compression will reduce the cross section of each constituent band and hydrogen separator zones. The bands and zones will thus broaden out. Broadening of the bands despite the lower concentration of hydrogen therein will maintain effectiveness of the zones as separators to prevent diffusion between constituent bands. Also, each length of constituent band will be exposed to the detector for a longer period. The net effect will be increased resolution of the constituents and accordingly enhancement of effectiveness of detection.

The palladium valve, hydrogen carrier gas transfer device may be used either initially or subsequently as a replacement for other hydrogen carrier gas separators in gas chromatograph-mass spectrometer sequential analyzing systems because of the much greater effectiveness in removing almost all of the hydrogen from the mixture of gases emerging from the chromatograph. It may also be utilized in a gas chromatograph alone, disposed between the column of adsorbents and a constituent detector to provide more definitive determination by enriching the effluent from the column just prior to detection by either substantially removing or reducing the amount of hydrogen in the effluent. Furthermore, the stalling or rediffusion problems, experienced with total removal of the hydrogen carrier gas can be obviated by utilizing a mixture of hydrogen with a carrier gas impermeable to the walls of the palladium valve such as helium, argon or nitrogen. By utilizing a minor amount of the second carrier gas the sensitivity of the detector will be chromatograph in the proportion of the ratio of hydrogen to the second carrier gas.

Figure 3:
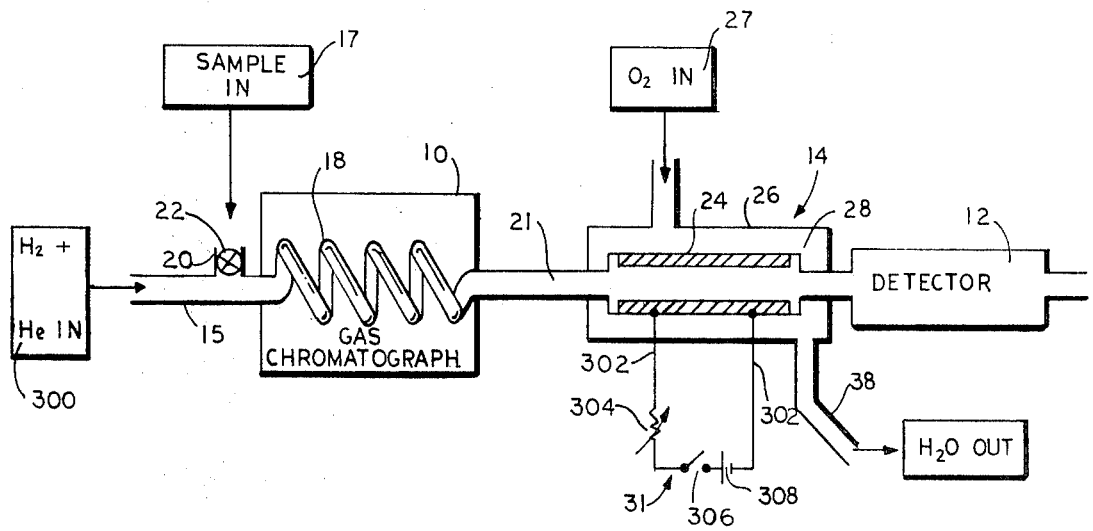
FIG. 3 is a schematic view of a mixed carrier gas analysis system according to the invention.

Referring now to FIG. 3, a gas analysis system further includes a flow regulated source 300 of helium and disposed to mix with the sample before entering the column 18. The source may be a pressurized cylinder containing a mixture of hydrogen or helium or the gases may be introduced from separate flow regulated sources.

The heating source 31 for the transfer device is specifically illustrated as a pair of electrical leads 302 connecting the tube wall 24 to a circuit containing a variable resistance 304 a switch 306 is closed, and the variable resistor 304 adjusted to provide sufficient power level to heat the tube to a temperature above 200° C. the tube becomes selectively permeable to hydrogen. The resistor is preferably set to provide a temperature of about 500° C. and the oxygen supply 27 regulated at a level sufficient to remove substantially all the hydrogen from the effluent. The sample in the effluent will then transfer to the helium which will carry it through the detector 14. If the flow rate of helium is equal to the flow rate of the sample, the sample concentration will be increased from the usual 1 percent to 50 percent with a proportional gain in sensitivity of the system. The flow of second carrier gas such as helium further provides propulsive means to sweep or scavenge the bands of constituents through the device to prevent recombination and therefore decreased resolution and accuracy.

Figure 4:
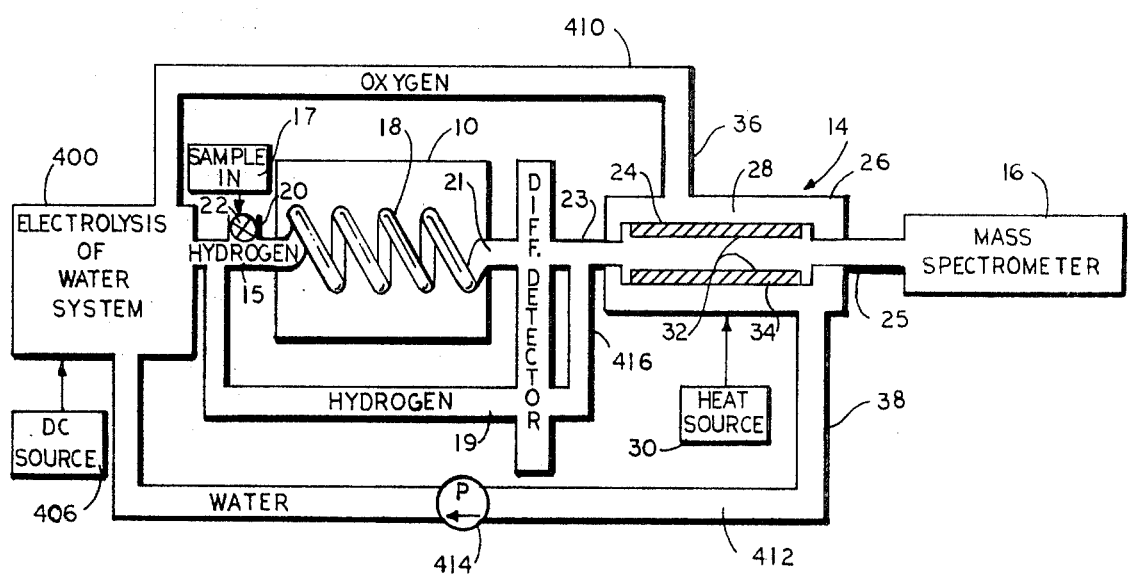
FIG. 4 is a schematic view of a third embodiment of a gas analysis system according to the invention.

A schematic representation of a closed cycle gas analysis system is illustrated in FIG. 4. The system includes in sequence an electrolytic cell 400, a gas chromatograph 10, a carrier transfer device 14 and a mass spectrometer 16.

The electrolytic cell 400 includes a pair of electrodes immersed in a body of water and connected in series to a source 406 of DC current. The cell 400 dissociates water into separate streams of hydrogen and oxygen. A portion of the hydrogen output from the cell 400 enters the column inlet 15 and mixes with the vaporous sample entering inlet 20 through metering valve 22.

Another portion of the hydrogen output is diverted through branch conduit 19 to the differential detector 12 and leaves the detector through outlet 416 and enters the effluent streams at the outlet 23 of the detector. The oxygen output of cell 400 is fed to the inlet 36 of the transfer device container 26 through a conduit 410. The water produced in the annular space 28 leaves the transfer device 14 through outlet drain 38 and is pumped by pump 414 through pipe 412 back to the cell 400. In an alternate embodiment the oxygen output is utilized as the balance gas in the differential detector before being delivered to the transfer device. The total hydrogen output from the electrolytic cell is fed to the column inlet.

It is evident that the total stoichiometric output of cell 400 is fed to the transfer device 14. All of the hydrogen output enters the interior of the palladium tube 24 and all of the oxygen output enters the annular space 28. When the heat source 30 is regulated to transfer all the hydrogen through the wall of the tube 24 into annular space 28, the hydrogen will stoichiometrically combine with the oxygen to form water which is recycled to the cell 400 by means of conduit 412 and pump 414.

The closed cycle system is of a particular interest for planetary exploration of planets such as Mars in which the atmosphere does not contain oxygen. For example, the carbon dioxide atmosphere of Mars will react with the hydrogen evolving from the tube, but the reaction is so slow that the removal of hydrogen from the surface of the heated tube will largely depend upon convection. The successful operation of the palladium transfer device depends considerably upon the presence of oxygen. Such a removal rate will probably not be fast enough for the requirements of a gas chromatograph-mass spectrometer separator.

The gas analysis system of the invention is well adapted to the special environmental constraints imposed on the operation of unmanned roving space vehicles in planetary exploration. The system will also be useful in biochemical and medical research into the origin of living matters and the causes and cures of diseases because of the ability to operate on small or trace quantities of samples. The palladium valve, per se, will be useful in any system requiring a hydrogen separator such as superhigh-vacuum pumpout systems where it may be used as hydrogen getter to remove residual hydrogen remaining in a system after conventional pumpout.

It is to be understood that only preferred embodiments of the invention have been disclosed and that modifications are permissible without departing from the scope of the invention.

What I claim is:

1. A gas analysis system comprising in combination:
    column means for separating a vaporous sample into an effluent containing sequential components dispersed in hydrogen as a first carrier gas;
    detector means for sensing the components of the sample;
    carrier gas transfer means disposed between said detector means and column means for receiving said effluent, removing said first carrier gas therefrom and for delivering an enriched effluent to said detector means, said transfer means including a palladium containing film which is totally and selectively permeable to said hydrogen carrier gas for receiving said effluent on one side thereof;
    means for heating said film to a temperature at which the film is permeable to hydrogen; and
    means for increasing the transfer rate of hydrogen through said film including means for flowing a hydrogen reactive fluid in contact with the obverse side of said film.

2. A system according to claim 1 in which the detector means is a mass-spectrometer.

3. A system according to claim 1 in which said fluid is a hydrogen reactive gas.

4. A system according to claim 3 in which the reactive gas is oxygen.

5. A method of analyzing a material comprising the steps of:
    dispersing said material in vaporous form in hydrogen as a first carrier gas;
    flowing said dispersion through a gas chromatographic column separator to produce an effluent containing fractionated components of the material sequentially suspended in the hydrogen carrier gas;
    passing said effluent through a carrier gas transfer device into contact with a first side of palladium containing film;
    heating said film to a temperature at which said film is totally and selectively permeable to hydrogen to transfer said hydrogen through said film to the obverse side thereof and concentrate said effluent on the first side thereof to form an effluent enriched in said components;
    flowing a hydrogen reactive fluid in contact with the obverse side of said film to increase the flow rate of hydrogen through said film; and
    detecting the presence of the components in the enriched effluent.

6. A method according to claim 5 in which said hydrogen carrier gas is totally removed in said transfer device.

7. A method according to claim 6 in which said effluent contains a second carrier gas impermeable to said film.

8. A method according to claim 7 in which said second carrier gas is helium.

9. A method according to claim 8 in which the transfer device comprises a tube comprising palladium heated to a temperature at which the walls of the tube become selectively permeable to hydrogen.

10. A method according to claim 9 in which the tube comprises a palladium-silver alloy heated to a temperature of at least 150° C.

11. A method according to claim 5 in which said fluid comprises a hydrogen reactive gas.

12. A method according to claim 11 in which said gas is oxygen which reacts with the hydrogen to form water.

13. A gas analysis system comprising in combination:

column means for separating a vaporous sample into an effluent comprising sequential components of the sample dispersed in a first carrier gas;

carrier gas transfer means for enriching said effluent comprising a thin walled tube selectively permeable to said first carrier gas having an inlet end for receiving said effluent tapering toward an outlet end for forming an enriched, reduced, cross section effluent; and detector means receiving said enriched effluent for sensing the components of said sample.

14. A system according to claim 13 in which said carrier gas comprises hydrogen and said tube comprises palladium.

15. A system according to claim 14 further including means for heating said tube to a temperature at which the wall of the tube is selectively permeable to hydrogen.

16. A system according to claim 13 further including means for pumping hydrogen through the wall of the tube.

17. A system according to claim 16 in which said pumping means comprise flow means for contacting the outside surface of said tube with a flow of hydrogen reactive fluid.

18. A system according to claim 17 in which the fluid is a hydrogen reactive gas.

19. A system according to claim 18 in which the reactive gas is oxygen.